(12) United States Patent
Fang et al.

(10) Patent No.: US 8,926,237 B2
(45) Date of Patent: Jan. 6, 2015

(54) MULTI-PIECE TWIST DRILL HEAD AND TWIST DRILL INCLUDING THE SAME

(75) Inventors: X. Daniel Fang, Brentwood, TN (US);
Jean-Luc Dufour, Franklin, TN (US);
David J. Wills, Franklin, TN (US)

(73) Assignee: Kennametal Inc., Latrobe, PA (US)

( * ) Notice: Subject to any disclaimer, the term of this patent is extended or adjusted under 35 U.S.C. 154(b) by 475 days.

(21) Appl. No.: 13/179,662

(22) Filed: Jul. 11, 2011

(65) Prior Publication Data
US 2013/0017028 A1    Jan. 17, 2013

(51) Int. Cl.
*B23B 51/02* (2006.01)
*B23B 27/16* (2006.01)

(52) U.S. Cl.
CPC ............... *B23B 51/02* (2013.01); *B23B 27/16* (2013.01); *B23B 2222/28* (2013.01); *B23B 2226/18* (2013.01); *B23B 2226/315* (2013.01); *B23B 2251/02* (2013.01); *B23B 2224/00* (2013.01); *B23B 2226/31* (2013.01); *B23B 2251/14* (2013.01); *Y10S 408/713* (2013.01)
USPC ............ 408/231; 408/227; 408/713; 408/144

(58) Field of Classification Search
CPC ............................. B23B 2251/02; B23B 51/02
USPC ......... 408/231, 232, 233, 227, 230, 223, 224, 408/225, 713, 239 R, 144
See application file for complete search history.

(56) References Cited

U.S. PATENT DOCUMENTS

| | | | |
|---|---|---|---|
| 458,640 A * | 9/1891 | Phillips | 408/214 |
| 598,142 A * | 2/1898 | Ferguson | 408/214 |
| 748,890 A | 1/1904 | Taylor | |
| 1,499,584 A * | 7/1924 | Litchfield | 408/211 |
| 2,294,969 A | 9/1942 | Engvall et al. | |
| 2,351,827 A * | 6/1944 | Mcallister | 408/144 |
| 2,826,104 A * | 3/1958 | Morin | 408/224 |
| 2,858,718 A | 11/1958 | Kohler | |
| 2,891,429 A * | 6/1959 | Tragge | 408/146 |
| 2,927,614 A * | 3/1960 | Ransom | 408/192 |
| 3,040,605 A | 6/1962 | Andreasson | |
| 3,076,357 A | 2/1963 | Benjamin et al. | |
| 3,228,267 A * | 1/1966 | Hebert | 408/146 |
| 3,687,565 A * | 8/1972 | Byers et al. | 408/201 |

(Continued)

FOREIGN PATENT DOCUMENTS

DE    10054850 A1 *    5/2002
EP    0 353 214 A2    1/1990

(Continued)

OTHER PUBLICATIONS

Office Action (non-final) mailed May 23, 2012 in U.S. Appl. No. 12/368,339.

*Primary Examiner* — Eric A Gates
*Assistant Examiner* — Paul M Janeski
(74) *Attorney, Agent, or Firm* — Larry R. Meenan, Esq.

(57) ABSTRACT

One non-limiting aspect of the present disclosure is directed to a multi-piece twist drill head. The multi-piece twist drill head includes a core piece formed from a first hard material, and a peripheral piece formed from a second hard material. The core piece and peripheral piece each comprise a cutting edge and are adapted to mate to provide a central region and a peripheral region, respectively, of the multi-piece twist drill head. A twist drill including the multi-piece twist drill head is also disclosed.

19 Claims, 11 Drawing Sheets

(56) References Cited

U.S. PATENT DOCUMENTS

| | | | | |
|---|---|---|---|---|
| 3,945,753 | A | * | 3/1976 | Byers et al. ............. 408/201 |
| RE28,900 | E | * | 7/1976 | Byers et al. ............. 408/201 |
| 4,060,335 | A | | 11/1977 | Holloway et al. |
| 4,076,443 | A | * | 2/1978 | Halpern ................. 408/191 |
| 4,115,024 | A | | 9/1978 | Sussmuth |
| 4,230,429 | A | | 10/1980 | Eckle |
| 4,248,555 | A | * | 2/1981 | Satou ................... 408/225 |
| 4,303,358 | A | | 12/1981 | Grusa |
| 4,340,327 | A | | 7/1982 | Martins |
| 4,355,932 | A | | 10/1982 | Koppelmann et al. |
| 4,561,812 | A | * | 12/1985 | Linden .................. 408/225 |
| 4,625,593 | A | * | 12/1986 | Schmotzer ............ 76/108.6 |
| 4,687,387 | A | | 8/1987 | Roos |
| 4,976,325 | A | * | 12/1990 | Garbarino .............. 175/394 |
| 5,094,571 | A | * | 3/1992 | Ekerot .................. 408/144 |
| 5,399,051 | A | * | 3/1995 | Aken et al. ............ 408/233 |
| 5,425,604 | A | * | 6/1995 | Scheer et al. .......... 408/83 |
| 5,458,210 | A | | 10/1995 | Sollami |
| 5,735,648 | A | | 4/1998 | Kleine |
| 5,788,431 | A | | 8/1998 | Basteck |
| 5,909,985 | A | | 6/1999 | Shiga et al. |
| 5,975,813 | A | * | 11/1999 | Schmotzer ............. 408/214 |
| 6,044,919 | A | | 4/2000 | Briese |
| 6,095,725 | A | * | 8/2000 | Stahl .................... 408/223 |
| 6,224,302 | B1 | | 5/2001 | Cole |
| 6,511,265 | B1 | | 1/2003 | Mirchandani et al. |
| 6,527,486 | B2 | | 3/2003 | Wiman et al. |
| 6,601,659 | B2 | | 8/2003 | Saitta et al. |
| 6,626,614 | B2 | * | 9/2003 | Nakamura ............... 408/59 |
| 6,655,882 | B2 | | 12/2003 | Heinrich et al. |
| 6,716,388 | B2 | | 4/2004 | Bruhn et al. |
| 6,913,424 | B2 | | 7/2005 | Yoshihiro et al. |
| 6,913,428 | B2 | | 7/2005 | Kress et al. |
| 7,108,460 | B2 | | 9/2006 | Chang |
| 7,241,089 | B2 | | 7/2007 | Mast et al. |
| 7,244,081 | B2 | | 7/2007 | Johnson et al. |
| 7,267,513 | B2 | | 9/2007 | Wiker et al. |
| 7,306,410 | B2 | | 12/2007 | Borschert et al. |
| 7,556,458 | B2 | * | 7/2009 | Heilmann et al. ....... 408/59 |
| 7,572,088 | B2 | * | 8/2009 | Biscay .................. 408/59 |
| 7,841,811 | B2 | * | 11/2010 | Thiele et al. ............ 407/96 |
| 8,057,135 | B2 | * | 11/2011 | Nordlin et al. .......... 408/214 |
| 8,388,280 | B1 | * | 3/2013 | Ison et al. .............. 408/224 |
| 2003/0118413 | A1 | | 6/2003 | Bruhn et al. |
| 2004/0124016 | A1 | | 7/2004 | Nuzzi et al. |
| 2007/0042217 | A1 | | 2/2007 | Fang et al. |
| 2010/0202845 | A1 | | 8/2010 | Fang et al. |
| 2010/0278603 | A1 | | 11/2010 | Fang et al. |

FOREIGN PATENT DOCUMENTS

| | | | |
|---|---|---|---|
| EP | 358901 | A1 * | 3/1990 |
| EP | 1 280 625 | B1 | 10/2007 |
| FR | 27878772 | A1 | 6/2006 |
| JP | 2008279682 | A * | 11/2008 |
| WO | WO 92/12817 | A1 | 8/1992 |
| WO | WO 2008/098636 | A1 | 8/2008 |

\* cited by examiner

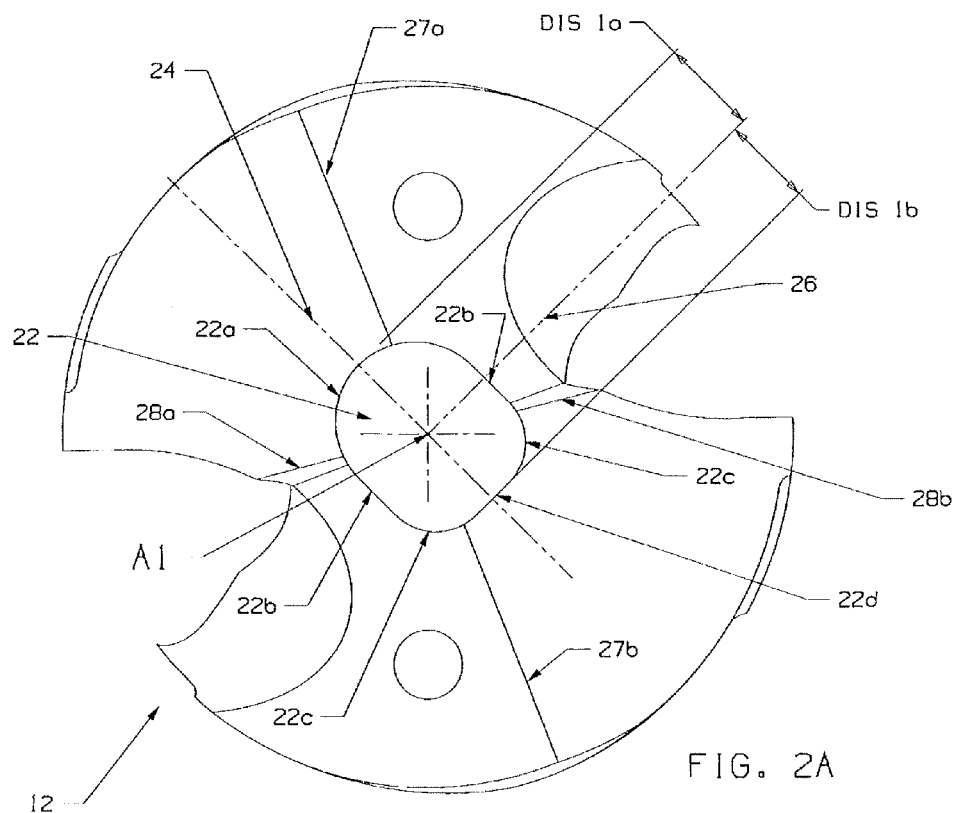
FIG. 2A
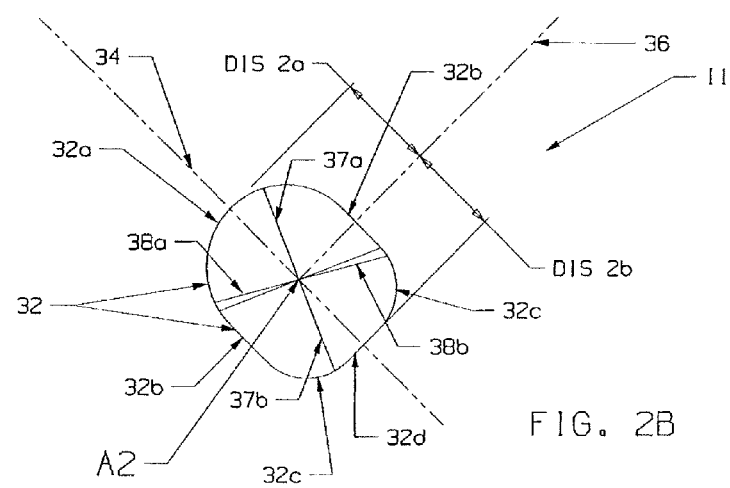
FIG. 2B
FIGURE 2

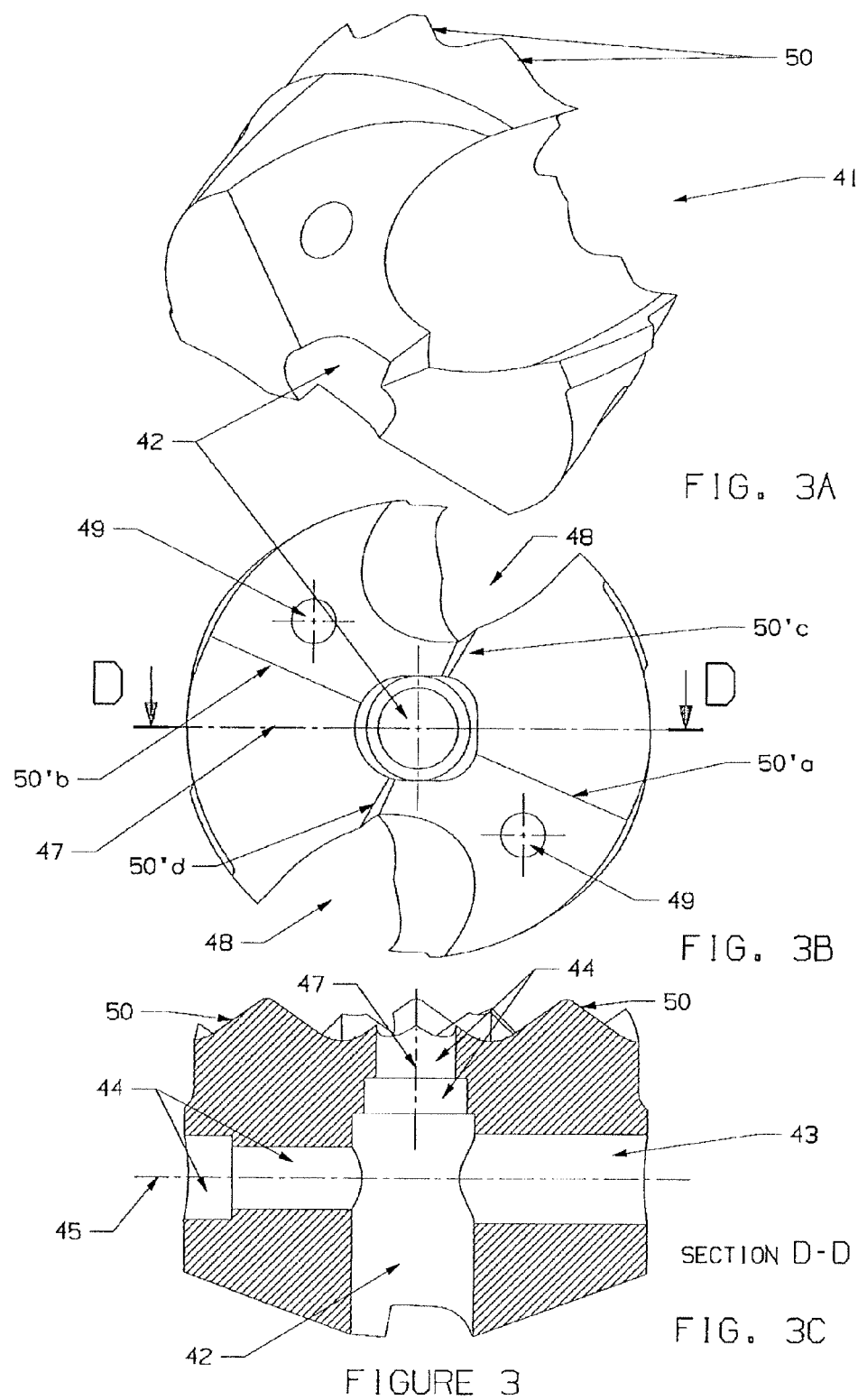

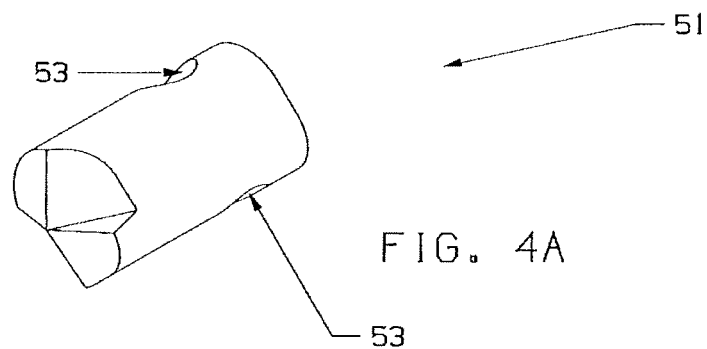
FIG. 4A
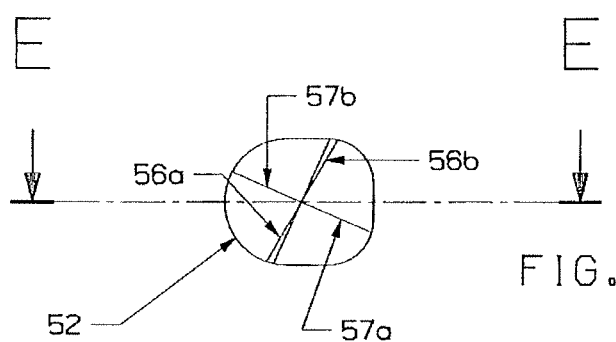
FIG. 4B
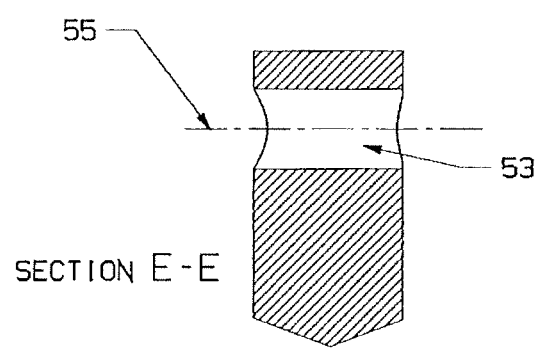
FIG. 4C
FIGURE 4

SECTION H-H

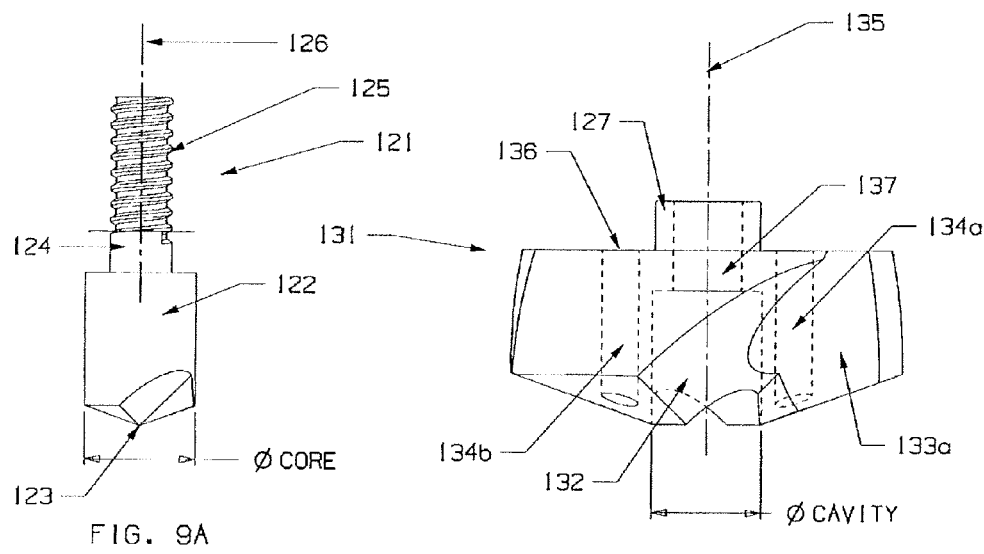
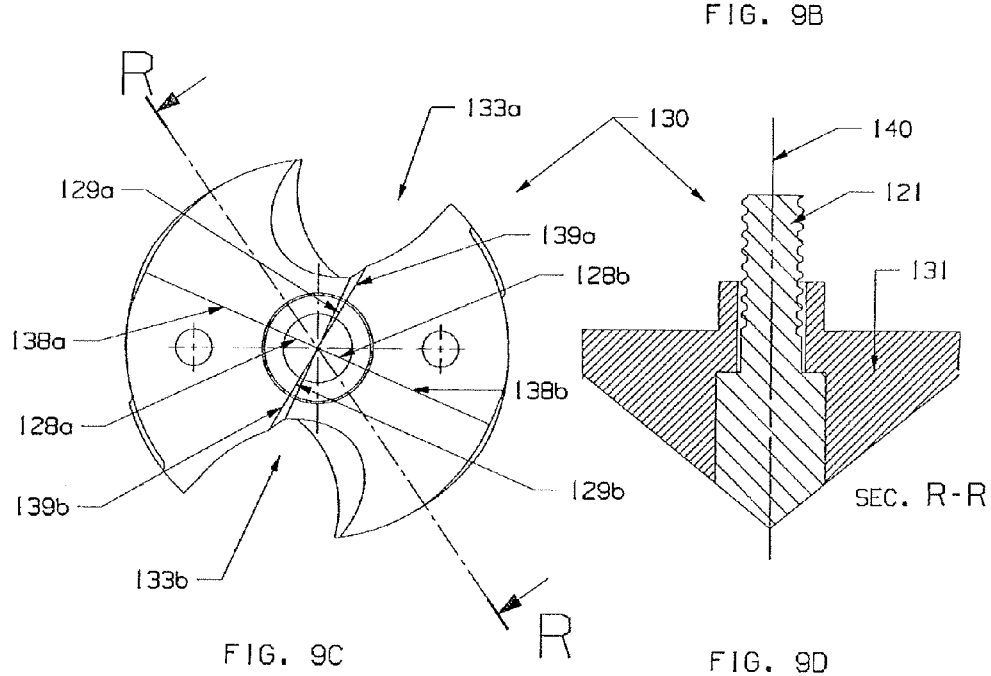
FIGURE 9

SEC. U-U

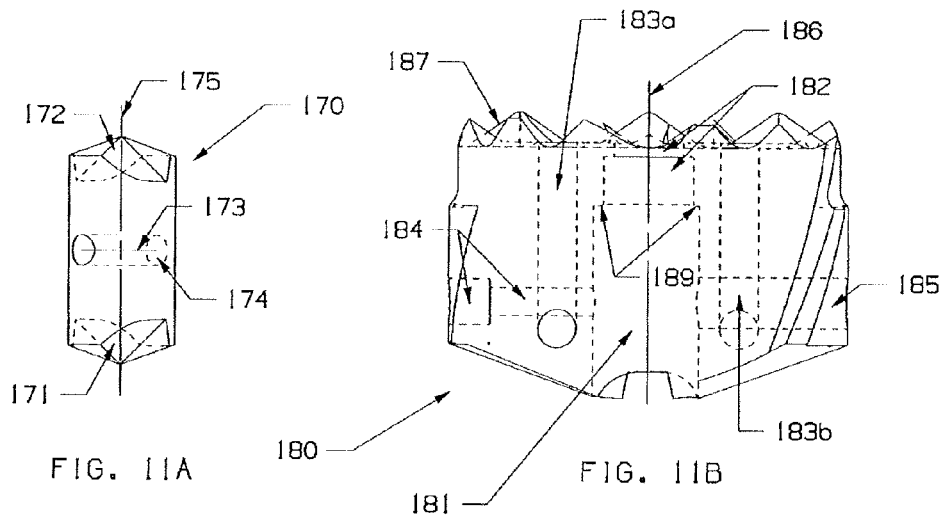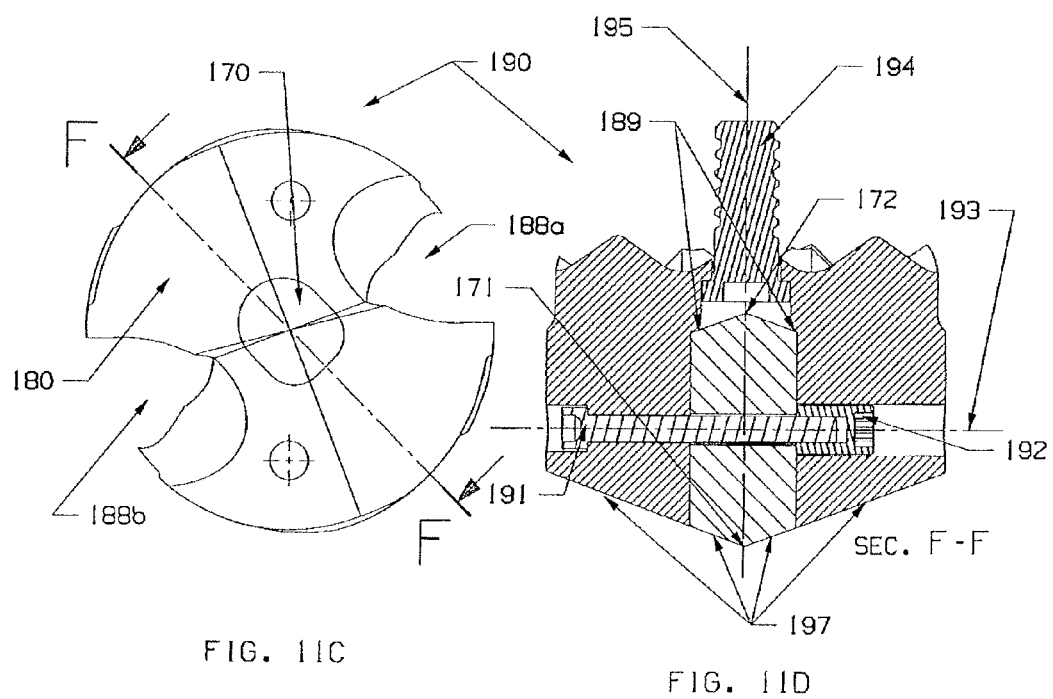
FIGURE 11

MULTI-PIECE TWIST DRILL HEAD AND TWIST DRILL INCLUDING THE SAME

TECHNICAL FIELD

The present disclosure relates to cutting tools used in machining operations. More particularly, the present disclosure relates to twist drill heads and twist drills.

BACKGROUND

Drilling is a cutting operation in which material is removed from a workpiece to provide a bore in or through the workpiece. Drilling is carried out by advancing a rotating drilling tool or "drill" into the workpiece in the direction of the drill's longitudinal axis. Common drill configurations include, for example, twist drills and spade drills. A twist drill is characterized by one or more helical flutes disposed along at least a portion of the length of the drill and which terminate at a working end of the drill (the "drill tip"), which includes cutting edges. In contrast, a spade drill includes a wide cutting blade at the drill tip and lacks helical flutes along its length. Twist drills have a more complex geometrical design than spade drills due to the helical flutes, and this makes twist drills generally more difficult to manufacture.

Twist drills are manufactured as either non-composite twist drills or composite twist drills. A problem limiting the performance of non-composite twist drills is that the cutting speed (rotational speed of the cutting edge relative to the workpiece) varies from zero at the drill's center to a maximum cutting speed at the drill's periphery. Because of these variations in cutting speed, non-composite twist drills do not experience uniform wear along the cutting edge on the drill tip. The wear rate of a point on the cutting edge of the drill tip depends on the location of the point relative to the center of the cutting edge. The conditions promoting wear on a drill's tip can be significantly more aggressive at the periphery than at the center of the drill tip.

To address this problem, composite twist drills have been manufactured that include different materials or different material grades in different regions of the drill, allowing for different wear-resistance properties in the drill's central and peripheral regions. Such an arrangement has been adapted to optimize drilling performance. A composite twist drill has a monolithic construction but includes materials having different mechanical properties in different regions of the drill. However, it is relatively costly to manufacture composite twist drills because, for example, the production process involves additional steps related to pressing and sintering powdered precursors of the at least two different materials or material grades.

Accordingly, it would be advantageous to provide an improved twist drill design that addresses the non-uniform cutting edge wear experienced by non-composite twist drills, but that need not be manufactured using the relatively costly techniques used in making composite twist drills.

SUMMARY

One aspect of the present disclosure is directed to a multi-piece twist drill head comprising: a core piece formed from a first hard material; and a peripheral piece formed from a second hard material. The core piece and the peripheral piece each comprise a cutting edge and are adapted to mate to provide a central region and a peripheral region, respectively, of the multi-piece twist drill head.

Another aspect of the present disclosure is directed to a twist drill comprising: a body portion; and a multi-piece twist drill head. The body portion includes a first end, a second end, and a periphery including at least one helical flute. An attachment portion is located at the first end of the body portion and is adapted to connect the multi-piece twist drill to a cutting tool. The multi-piece twist drill head is adapted to attach to the second end of the body portion and includes a core piece formed from a first hard material and a peripheral piece formed from a second hard material. The core piece and peripheral piece are adapted to mate to provide a central region and a peripheral region, respectively, of the multi-piece twist drill head It is understood that the invention disclosed and described herein is not limited to the embodiments disclosed in this Summary.

BRIEF DESCRIPTION OF THE DRAWINGS

The characteristics of various non-limiting embodiments disclosed and described herein may be better understood by reference to the accompanying figures, in which:

FIGS. 2A and 2B schematically depict various aspects of the peripheral piece and the core piece of the multi-piece twist drill head embodiment shown in FIGS. 1A to 1C;

FIGS. 3A to 3C schematically depict various aspects of a non-limiting embodiment of a peripheral piece of a multi-piece twist drill head according to the present disclosure;

FIGS. 4A to 4C schematically depict various aspects of a non-limiting embodiment of a core piece of a multi-piece twist drill head according to the present disclosure;

FIGS. 9A to 9D schematically depict various aspects of a further non-limiting embodiment of a multi-piece twist drill head according to the present disclosure, wherein permanent mechanical joining is used to mate a core piece and a peripheral piece of the twist drill head;

FIGS. 11A to 11D schematically depict various aspects of yet an additional non-limiting embodiment of a multiple-piece twist drill head according to the present disclosure, wherein a core piece of the drill head is indexable with two identical drill tip geometries.

Figure 1:
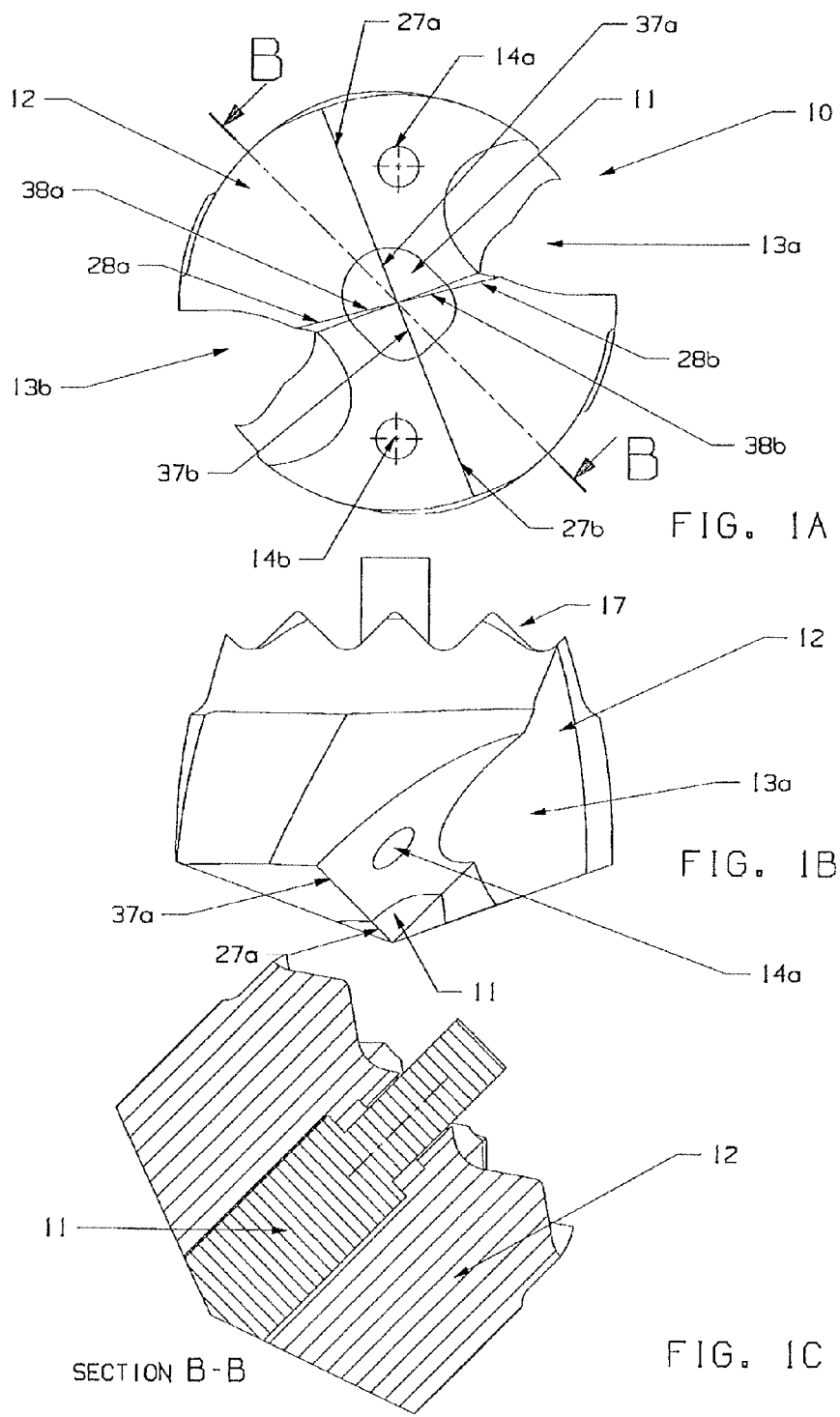
FIGS. 1A to 1C schematically depict various aspects of one non-limiting embodiment of a multi-piece twist drill head constructed according to the present disclosure.

The reader will appreciate the foregoing details, as well as others, upon considering the following detailed description of certain non-limiting embodiments according to the present disclosure. The reader may also comprehend additional details upon implementing or using embodiments described herein.

DETAILED DESCRIPTION OF CERTAIN NON-LIMITING EMBODIMENTS

It is to be understood that the descriptions of the disclosed non-limiting embodiments herein may have been simplified to illustrate only those features and characteristics that are relevant to a clear understanding of the disclosed embodiments, while eliminating, for purposes of clarity, other features and characteristics. Persons having ordinary skill in the art, upon considering this description of the disclosed embodiments, will recognize that other features and characteristics may be desirable in a particular implementation or application of the disclosed embodiments. However, because such other features and characteristics may be readily ascertained and implemented by persons having ordinary skill in the art upon considering this description of the disclosed embodiments, and are, therefore, not necessary for a complete understanding of the disclosed embodiments, a description of such features, characteristics, and the like, is not provided herein. As such, it is to be understood that the description set forth herein is merely exemplary and illustrative of the disclosed embodiments and is not intended to limit the scope of the invention defined by the claims.

In the present disclosure, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited herein is intended to include all lower numerical limitations subsumed therein and any minimum numerical limitation recited herein is intended to include all higher numerical limitations subsumed therein. Accordingly, Applicants reserve the right to amend the present disclosure, including the claims, to expressly recite any sub-ranges subsumed within the ranges expressly recited herein. All such ranges are intended to be inherently disclosed herein such that amending to expressly recite any such sub-ranges would comply with the requirements of, for example, 35 U.S.C. §112, first paragraph, and 35 U.S.C. §132(a).

The grammatical articles "one", "a", "an", and "the", as used herein, are intended to include "at least one" or "one or more", unless otherwise indicated. Thus, the articles are used herein to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage indicates otherwise.

Any patent, publication, or other disclosure material that is said to be incorporated by reference herein, is incorporated herein in its entirety unless otherwise indicated, but only to the extent that the incorporated material does not conflict with existing definitions, statements, or other disclosure material expressly set forth in this description. As such, and to the extent necessary, the express disclosure as set forth herein supersedes any conflicting material incorporated by reference herein. Any material, or portion thereof, that is said to be incorporated by reference herein, but which conflicts with existing definitions, statements, or other disclosure material set forth herein is only incorporated to the extent that no conflict arises between that incorporated material and the existing disclosure material. Applicants reserve the right to amend the present disclosure to expressly recite any subject matter, or portion thereof, incorporated by reference herein.

The present disclosure includes descriptions of various embodiments. It is to be understood that the various embodiments described herein are exemplary, illustrative, and non-limiting. Thus, the present disclosure is not limited by the description of the embodiments. Rather, the invention is defined by the claims, which may be amended to recite any features or characteristics expressly or inherently described in or otherwise expressly or inherently supported by the present disclosure. Further, Applicants reserve the right to amend the claims to affirmatively disclaim features or characteristics that may be present in the prior art, but not necessarily expressly described herein. Therefore, any such amendments would comply with the requirements of 35 U.S.C. §112, first paragraph, and 35 U.S.C. §132(a). The various embodiments disclosed and described herein can comprise, consist of, or consist essentially of the features and characteristics as variously described herein.

The meanings of certain terms used in the present description and claims are as follows:

As used herein, a "multi-piece" twist drill head refers to a twist drill head that includes two or more pieces that are mated to form the twist drill head. It will be apparent from the following description, for example, that certain embodiments of the multi-piece twist drill head according to the present disclosure may include 2, 3, or more individual pieces that are mated to form the drill head.

As used herein, "mate" or "mated" means that at least a region of each of the referenced individual pieces are associated together. Also, for example, first and second pieces that are "mated" may include one or more pieces intermediate the first and second pieces.

As used herein, "hard material" refers to a material selected from the group consisting of cemented carbide material, ceramic material, and hard diamond-containing material.

As used herein, a "cemented carbide" refers to a composite material comprising hard metallic particles including one or more of metal carbide, metal nitride, and metal silicide particles dispersed in a continuous binder phase which binds the hard particles into the composite. The hard particles may comprise, for example and without limitation, grains of carbides, nitrides, and/or silicides of one or more transition metals selected from titanium, vanadium, chromium, zirconium, hafnium, molybdenum, niobium, tantalum, and tungsten. The binder phase that binds or "cements" the hard metallic particles together may be, for example and without limitation, at least one material selected from cobalt, cobalt alloy, nickel, nickel alloy, iron, and iron alloy. Additionally, alloying elements such as, for example and without limitation, chromium, molybdenum, ruthenium, boron, tungsten, tantalum, titanium, and niobium may be included in the binder phase to enhance desired properties. Various cemented carbide materials may be produced by varying at least one of the composition of the dispersed phase, the composition of the continuous phase, the grain size of the dispersed phase, the volume fractions of the phases, and the method used to make the composite material. Cemented carbides based on a tungsten carbide dispersed hard phase and a cobalt or cobalt alloy binder phase are currently the most commercially important cemented carbide materials available.

Certain non-limiting embodiments disclosed herein are directed to multi-piece twist drill heads. One such non-limiting embodiment is presented as multi-piece twist drill head 10 in FIGS. 1A to 1C. The disclosed multi-piece twist drill head 10 comprises core piece 11 and peripheral piece 12. The multi-piece twist drill head 10 is shown in a front-end view in FIG. 1A, a side view in FIG. 1B, and a sectional view in FIG. 1C taken along the rotational axis of the drill head 10 at line B-B in FIG. 1A. As indicated in FIGS. 1A to 1C, the core piece 11 is associated with or "mates" with the peripheral piece 12 by positioning the core piece 11 in a cavity (22 in FIG. 2A, for example) located in a central region of the peripheral piece 12. The multi-piece twist drill head 10 is thereby provided by mating the core piece 11 and the peripheral piece 12.

The peripheral piece 12 is shown in a front-end view in FIG. 2A with the core piece 11 removed. The peripheral piece 12 comprises cavity 22 for receiving the core piece 11, which is shown in isolation in a front-end view in FIG. 2B. The periphery of the cavity 22 of the peripheral piece 12 shown in FIG. 2A is formed by three arcs (22a, 22c, 22c) and three sides (22b, 22b, 22d). As suggested in FIGS. 1A to 1C, the cavity 22 and the core piece 11 are shaped to allow the core piece 11 and the peripheral piece 12 to closely abut when the core piece 11 is positioned within the cavity 22. A cavity 22 in the peripheral piece 12 having an asymmetrical periphery is illustrated in FIG. 2A. The asymmetrical nature of the cavity 22 is confirmed by comparing distances from the rotational axis A1 of the drill head 10 to the periphery of the cavity 22. For example, DIS 1a ("distance 1a") and DIS 1b in FIG. 2A are unequal, and this shows that the periphery of the cavity 22 of the peripheral piece 12 is asymmetrical relative to a rotational axis A1 (identified by the line 26 used to measure the compared distances) of the multi-piece twist drill head 10. Peripheral piece 12 further includes cutting edges 27a and 27b, which are generally directionally aligned and separated by the cavity 22, and cutting edges 28a and 28b, which also are generally directionally aligned and separated by the cavity 22. With reference to FIG. 1A, the peripheral piece 12 optionally includes one or more features such as, for example, helical flutes 13a and 13b, coolant holes 14a and 14b, and crests 17 formed about a surface of the peripheral piece 12 that is adapted to attach the peripheral piece 12 to a body portion of the twist drill. The crests 17 may provide for a more secure attachment between other elements of the twist drill when the multi-piece twist drill head 10 is assembled with other elements to provide a twist drill.

An additional non-limiting embodiment of a peripheral piece 41 for a multi-piece twist drill head according to the present disclosure is shown in a perspective view in FIG. 3A, a front-end view in FIG. 3B, and sectional view of FIG. 3C, wherein the section is taken through the rotational axis of the peripheral piece 41 at line D-D in FIG. 2B. Peripheral piece 41 includes cavity 42 for a core piece (not shown in FIGS. 3A to 3C), flutes 48, coolant holes 49, and crests 50. In certain non-limiting embodiments, as shown in FIG. 3C, the cavity 42 positioned through the peripheral piece 41 may comprise a stepped region 46 lying along the drill head's rotational axis 47, and a cross cavity including regions 43 and 44 may be provided along a lateral axis 45 intersecting the cavity 42 at a generally right angle. As suggested in FIG. 3C, the cross cavity region 43 may have a diameter greater than the diameter of the cross cavity region 44, and the region 44 may be of a stepped design. As further suggested by FIG. 3C, an element disposed through the cross cavity formed by sections 43,44 will pass laterally through cavity 42. The peripheral piece 41 further includes directionally aligned edges 50'a and 50'b, which are separated by the cavity 42, as well as directionally aligned cutting edges 50'c and 50'd, which also are separated by the cavity 42.

Referring to FIG. 2B, the periphery 32 of the core piece 11 is formed of three arcs (32a, 32c, 32c) and three sides (32b, 32b, 32d). The periphery 32 of the core piece 11 is asymmetrical relative to a rotational axis A2 of the multi-piece twist drill head 10. The asymmetrical nature of the periphery of core piece 11 is confirmed by comparing distances from the rotational axis A2 to the periphery of the core piece 11. For example, DIS 2a ("distance 2a") and DIS 2b in FIG. 2BA are unequal, and this shows that the periphery of the core piece 11 is asymmetrical relative to rotational axis A2 (identified by the line 36 used to measure the compared distances). As suggested by considering FIGS. 2A and 2B, when the core piece 11 is disposed in the cavity 22 of the peripheral piece 12, the orientation of the core piece 11 within the cavity 22 is such that axis 34 shown in FIG. 2B is aligned with axis 24 shown in FIG. 2A. An asymmetrical design for the periphery of the core piece 11 may be advantageous as it will be easier to properly orient the core piece 11 in the cavity 22 of the peripheral piece 12. An asymmetrical design also may be advantageous because as the multi-piece twist drill head 10 rotates and advances into a workpiece, any gap on the front face of the front face of the drill head 10 existing between the core piece 11 and the peripheral piece 12 will not sweep over the same region of the workpiece and, therefore, a lip or flange of undrilled material will not remain on the bottom of the drilled hole.

An additional non-limiting embodiment of a core piece 51 for a multi-piece twist drill head according to the present disclosure is shown in a perspective view in FIG. 4A, a front-end view in FIG. 4B, and a sectional view in FIG. 4C, wherein the core piece 51 is shown sectioned along its longitudinal axis at line E-E in FIG. 4B. In certain non-limiting embodiments, the periphery of the core piece 51 is similar to or closely follows the periphery of the cavity 42 of the peripheral piece 41 in which the core piece 51 is disposed to form the multi-piece twist drill head. In certain non-limiting embodiments, the periphery of the core piece 51 may be such that there is a small gap provided between the periphery of the core piece 51 and the periphery of the cavity 42 in the peripheral piece 41 in which the core piece 51 is disposed. As best shown in FIG. 4C, the core piece 51 may include a cross cavity 53 including a longitudinal axis 55 that passes laterally through the core piece 51. The position of the cross cavity 53 is indicated in FIG. 4A. Core piece 51 further includes directionally aligned cutting edges 56a and 56b, and directionally aligned cutting edges 57a and 57b.

It will be understood that the core piece and the peripheral piece of certain embodiments of a multi-piece twist drill head according to the present disclosure may be separately removed and replaced with a new piece. Thus, for example, if the core piece or peripheral piece wears or become damaged in such embodiments, it may be individually removed from the twist drill head and replaced.

As noted in the description of embodiments above, the core piece and/or the peripheral piece may comprise cutting edges suitable for twist drilling operations. For example, the cutting edges provided on a core piece may form a conventional twist drill tool tip geometry, and cutting edges provided on a peripheral piece may form a partial twist drill front geometry and a twist drill side cutting geometry.

In certain non-limiting embodiments, the periphery 32 of the core piece 11 has the same shape as the cavity 22 of the peripheral piece 12. As shown in FIGS. 1A and 1B, this arrangement permits the cutting edges (37*a*, 37*b*) of the core piece 11 to be aligned with the cutting edges (27*a*, 27*b*) of the peripheral piece 12. This also permits the cutting edges (38*a*, 38*b*) of the core piece 11 to be aligned with the cutting edges (28*a*, 28*b*) of the peripheral piece 12. The aligned cutting edges may provide a conventional twist drill tip geometry. It will be understood that an asymmetric design of the periphery of the core piece and/or peripheral piece is not a requirement of the present invention, although such a feature may provide certain advantages.

In certain non-limiting embodiments of multi-piece twist drill head 10, the core piece 11 is formed from or includes a first hard material, and the peripheral piece 12 is formed from or includes a second hard material that differs in some respect from the first hard material. For example, the first hard material may be a different material or a different grade of material than the second hard material and thereby have one or more mechanical properties differences. Non-limiting examples of properties that may differ between the first and second hard materials may be one or more of hardness, toughness, wear resistance, fracture resistance, and elongation. In certain non-limiting embodiments, the first hard material may be or include a material selected from a group consisting of a cemented carbide, a ceramic, and a hard diamond-containing material, and the second hard material may be or include a material selected from a group consisting of a cemented carbide, a ceramic, and a hard diamond-containing material. In certain non-limiting embodiments, the first hard material and the second hard material may be different grades of the same material selected from the group consisting of a cemented carbide, a ceramic, and a hard diamond-containing material.

In certain embodiments, the first hard material included in the core piece may exhibit relatively greater toughness, which provides enhanced shock resistance to the central region of the drill tip to prevent chipping, and the second hard material included in the peripheral piece may exhibit greater wear resistance, which addresses the more severe wear forces experienced at outer regions of the drill tip cutting edge due to higher speeds. Given the fact that rotational speed is zero at the rotational axis of the drill tip and increases with the distance from the rotational axis, the peripheral piece may be constructed of or include a hard material having greater wear resistance than the hard material of the core piece. As an example, the peripheral piece may be formed from a grade FR10 cemented carbide material, which has a hardness of 91.9 HRA and includes 10 weight percent cobalt (based on total weight of the cemented carbide material) in the binder phase, and the core piece may be formed from a grade FR15 cemented carbide material, which has hardness of 90.8 HRA and includes 15 weight percent cobalt (based on total weight of the cemented carbide material) in the binder phase. As another example, the peripheral piece may be formed from a grade GH1 cemented carbide material, which has hardness of 92.8 and 6 weight percent cobalt (based on total weight of the cemented carbide material) in the binder phase, and the core piece may be formed from grade FR10 cemented carbide material. In an additional example, the core piece may be formed from grade GH1 cemented carbide material, and the peripheral piece may be formed from a diamond-based hard material such as PCD with hardness greater than 92.8 HRA. Although certain embodiments of a multi-piece twist drill according to the present disclosure include core and peripheral pieces formed of or including different hard materials, in other possible embodiments the core piece and the peripheral piece are formed of the same material.

The core piece and peripheral piece of the multi-piece twist drill head may be adapted to mate to provide a central region and a peripheral region. In certain non-limiting embodiments, mating of the core piece and the peripheral piece may be done by one of permanent mechanical joining or non-permanent mechanical joining.

As used herein, "permanent mechanical joining" means that the core piece and the peripheral piece initially are separate formed pieces, but are not separable once mechanically joined. Permanent mechanical joining includes, for example, a hydraulic press fit to forcibly dispose and retain the core piece 11 in the cavity 22 of the peripheral piece 12. Possible examples of permanent mechanical joining in addition to hydraulic press fitting include, for example, soldering, welding, brazing, and adhering with an adhesive. In cases of permanent mechanical joining, only the multi-piece twist drill head comprising both the core piece and peripheral piece may be removed and replaced from the twist drill as a whole given that the core and peripheral pieces cannot be separated once. However, as suggested above, the peripheral piece and core piece may be formed of or include different materials or material grades. In permanent mechanical joining, the asymmetrical geometry of the cavity 22 of the peripheral piece 12 may not be as important a feature so long as the cutting edges (27*a*, 27*b*, 28*a*, 28*b*) of the peripheral piece 12 are properly aligned with the cutting edges (37*a*, 37*b*, 38*a*, 38*b*) of the core piece 11 when mating the pieces.

As used herein, "non-permanent mechanical joining" means that the core piece and the peripheral pieces may be separated after they are mechanically joined, thereby allowing one of the pieces to be replaced without replacing the entire twist drill head or the other piece. Examples of non-permanent mechanical joining involve retaining the core piece 11 in the relatively larger cavity 22 of the peripheral piece 12 using one or more of fastening, clamping, and locking. In non-permanent mechanical joining, providing an asymmetrical geometry for the cavity 22 of the peripheral piece 12 and the core piece 11 as described above may help to prevent rotation and improper positioning and orientation of the core piece 11 within the cavity 22 of the peripheral piece 12. More specific non-limiting examples of non-permanent mechanical joining techniques include fastening the core piece in the peripheral piece with a screw, fastening the core piece in the peripheral piece with a nut and bolt, surface contact clamping the core piece in the peripheral piece, wedge clamping the core piece in the peripheral piece, wedge locking the core piece in the peripheral piece, cam clamping the core piece in the peripheral piece, and cam locking the core piece in the peripheral piece. It will be understood that in such techniques, one may remove or disengage the fastening device to thereby allow the core piece to be removed from a mating relationship with the peripheral piece. In cases of non-permanent mechanical joining, the core and peripheral pieces may each individually be removed and replaced, which provides the benefit of allowing removal and replacement of only the piece that is broken or worn.

Figure 5:
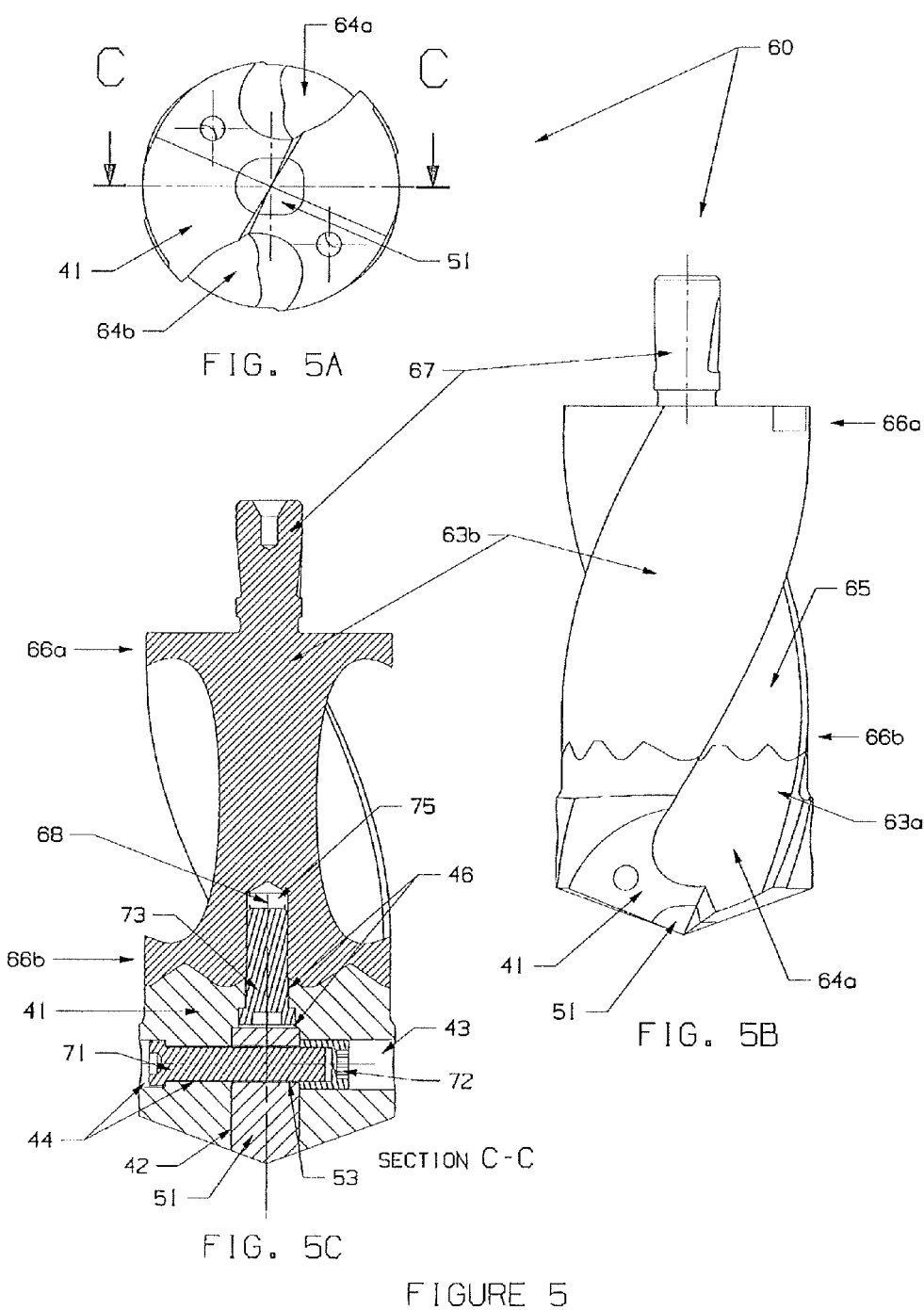
FIGS. 5A to 5C schematically depict various aspects of a non-limiting embodiment of a twist drill according to the present disclosure, including a body portion, an attachment portion, and a multi-piece twist drill head including the peripheral piece shown in FIGS. 3A to 3C and the core piece shown in FIGS. 4A to 4C.

FIGS. 5A to 5C are schematic illustrations showing aspects of one non-limiting embodiment of a twist drilling tool assembly or, more simply, a "twist drill", according to the present disclosure. FIG. 5A is a schematic front-end view of the twist drill 60. FIG. 5B is a schematic side-view of twist drill 60, which comprises a multi-piece twist drill head 63*a* and a body portion 63*b* in the form of a twist drill tool holder. FIG. 5C is a sectioned view of the twist drill 60, taken through the rotational axis of the drill 60 in the direction of arrows C-C in FIG. 5A and shown in the scale of FIG. 5B. The body portion 63*b* includes a first end 66*a*, a second end 66*b*, and a periphery including at least one helical flute 65. The helical flute 65 aligns with at least one helical flute 64*a* of peripheral piece 41 when the drill head 63*a* is attached to the body portion 63*b*. An attachment portion 67 is positioned at the first end 66*a* of the body portion 63*b* and is adapted to connect the twist drill 60 to a machine tool. The multi-piece twist drill head 63*a* is attached to the second end 66*b* of the body portion 63*b*. The multi-piece twist drill head 63*a* includes core piece 51 and peripheral piece 41, which are mated together with the core piece 51 positioned in the cavity 42 of the peripheral piece 41, and the drill head 63*a* is mounted on the body portion 63*b*. The core piece 51 and the peripheral piece 41 are adapted to provide a central region and a peripheral region, respectively, of the multi-piece twist drill head 63*a*. As shown in FIG. 5B, point B represents the tool tip of the core piece 51 of the multi-piece twist drill head 63*a* which is on the drill axis 68 of the twist drill 60.

As shown in FIG. 5C, core piece 51 may be mechanically joined with the peripheral piece by a non-permanent arrangement wherein a threaded bolt 71 is disposed through the cross cavity region 44 of the peripheral piece 41, through cross cavity 53 of the core piece 51, and extends into cross cavity region 43 of the peripheral piece 41. An internal wrench nut 72 is disposed in cross cavity region 43 and is threadedly attached to the bolt 71, thereby retaining the bolt 71 in the cavities 44,53,43 and securing the core piece 51 in the cavity 42 of the peripheral piece 41. The pieces 41,51 may be detached from one another by disconnecting the nut 72 from the bolt 71 and removing the bolt 71 from the aligned cavities 44,53,43. In certain non-limiting embodiments, the core piece 51 and the peripheral piece 41 may be mated together to form the multi-piece twist drill head 63*a* using other non-permanent techniques, including those techniques previously described herein In the non-limiting embodiment shown in FIGS. 5A to 5C, the multi-piece twist drill head 63*a* is releasably secured to the attachment portion 63*b* by screw 73 that is disposed in a stepped region 46 of the cavity 42 of the peripheral piece 41. The screw 73 is threadedly secured in a threaded bore 75 provided in the second end 66*b* of the attachment portion 63*b*. As indicated in FIG. 5C, the longitudinal axes of the screw 73 and the core piece 51 are aligned and follow the rotational axis of the twist drill 60. Accordingly, it will be understood that in assembling the components of twist drill 60 one may first threadedly attach the peripheral piece 41 to the attachment portion 63*b* using threaded screw 73, and then dispose and secure the core piece 51 in the cavity 42 of the peripheral piece 41 using bolt 71 and nut 72. Multi-piece twist drill head 63*a* may be detached from attachment portion 63*b* by removing bolt 71 to gain access to the screw 73, and then removing the screw 73. To address wear and/or damage, any core piece 51 or peripheral piece 41 may be individually removed and replaced, without the need to also replace the remaining piece.

In certain alternative non-limiting embodiments, the multi-piece twist drill head 63A may be secured to the attachment portion 63*b*, and the core piece 51 may be secured to the peripheral piece, using other non-permanent arrangements, such as those previously described in the present disclosure. It will be understood that the core piece 51 and peripheral piece 41 of the multi-piece twist drill head 63*a* may be mated and may not be connected together, but rather separately secured to a twist drill tool holder 63*b* by their respective bolts, nuts, and screws.

Figures 6, 6A, 6B, 6C:
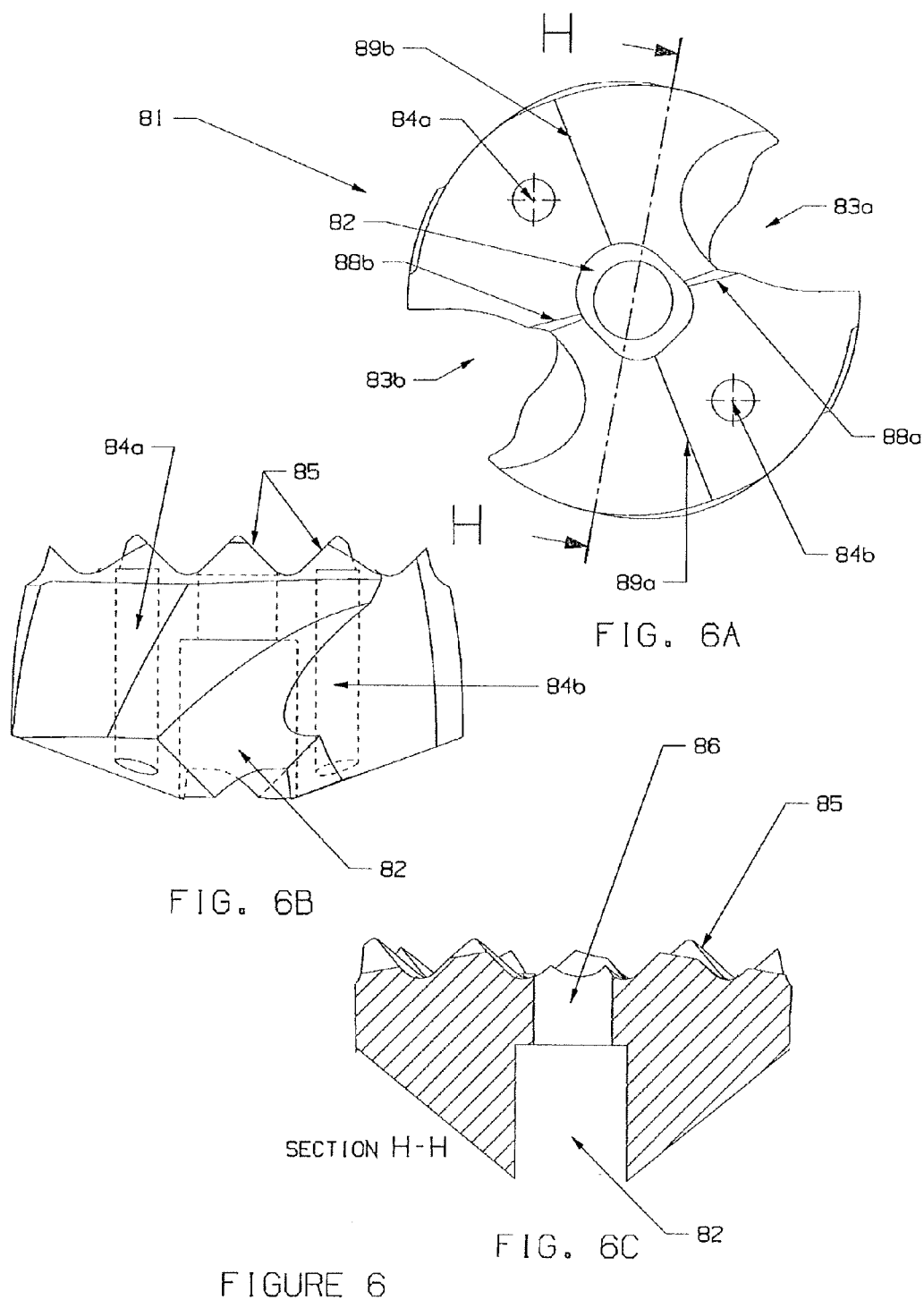
FIGS. 6A to 6C schematically depict various aspects of an additional non-limiting embodiment of a peripheral piece for a multi-piece twist drill head according to the present disclosure.
Figure 7:
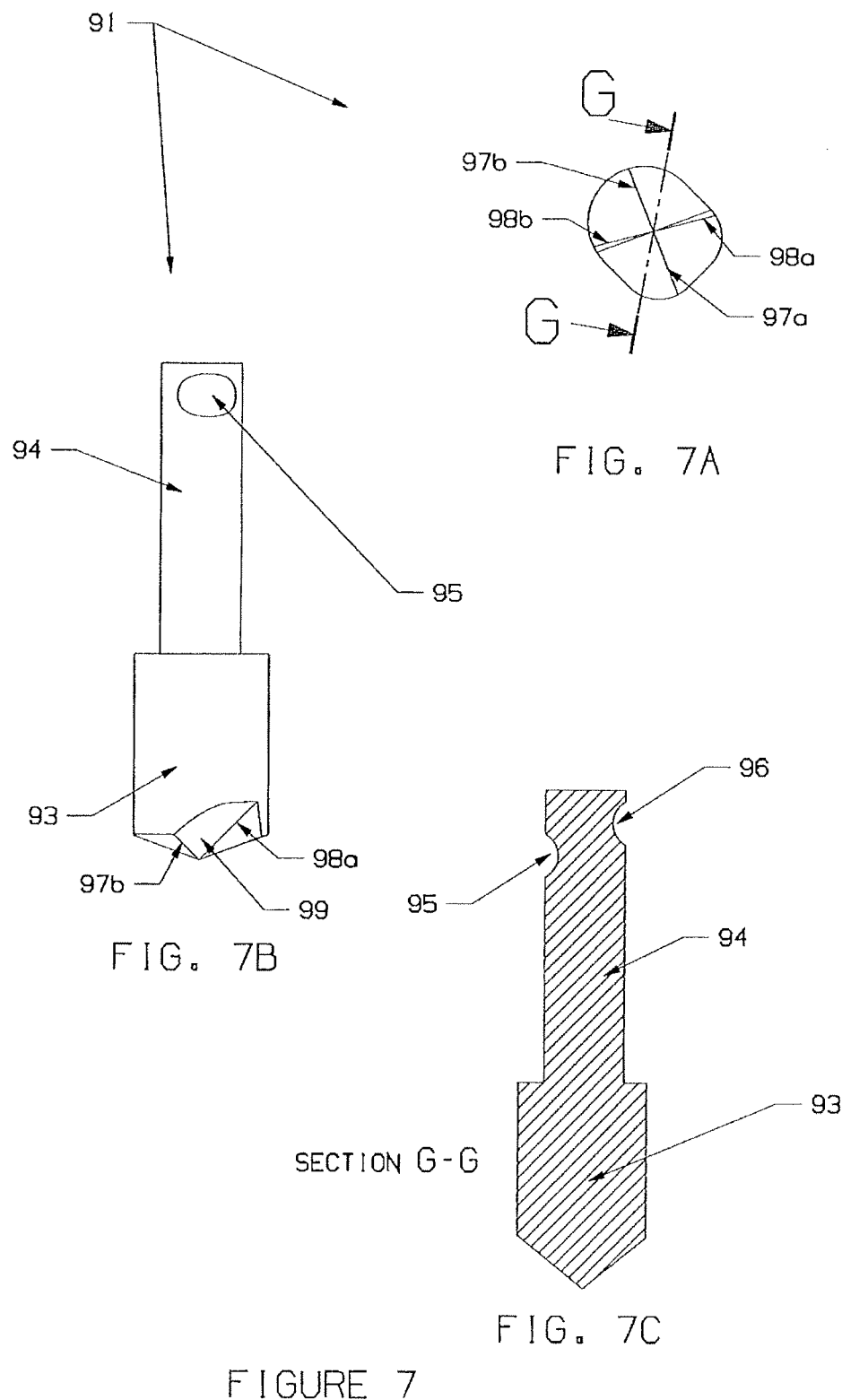
FIGS. 7A to 7C schematically depict various aspects of an additional non-limiting embodiment of a core piece for a multi-piece twist drill head according to the present disclosure.
Figure 8:
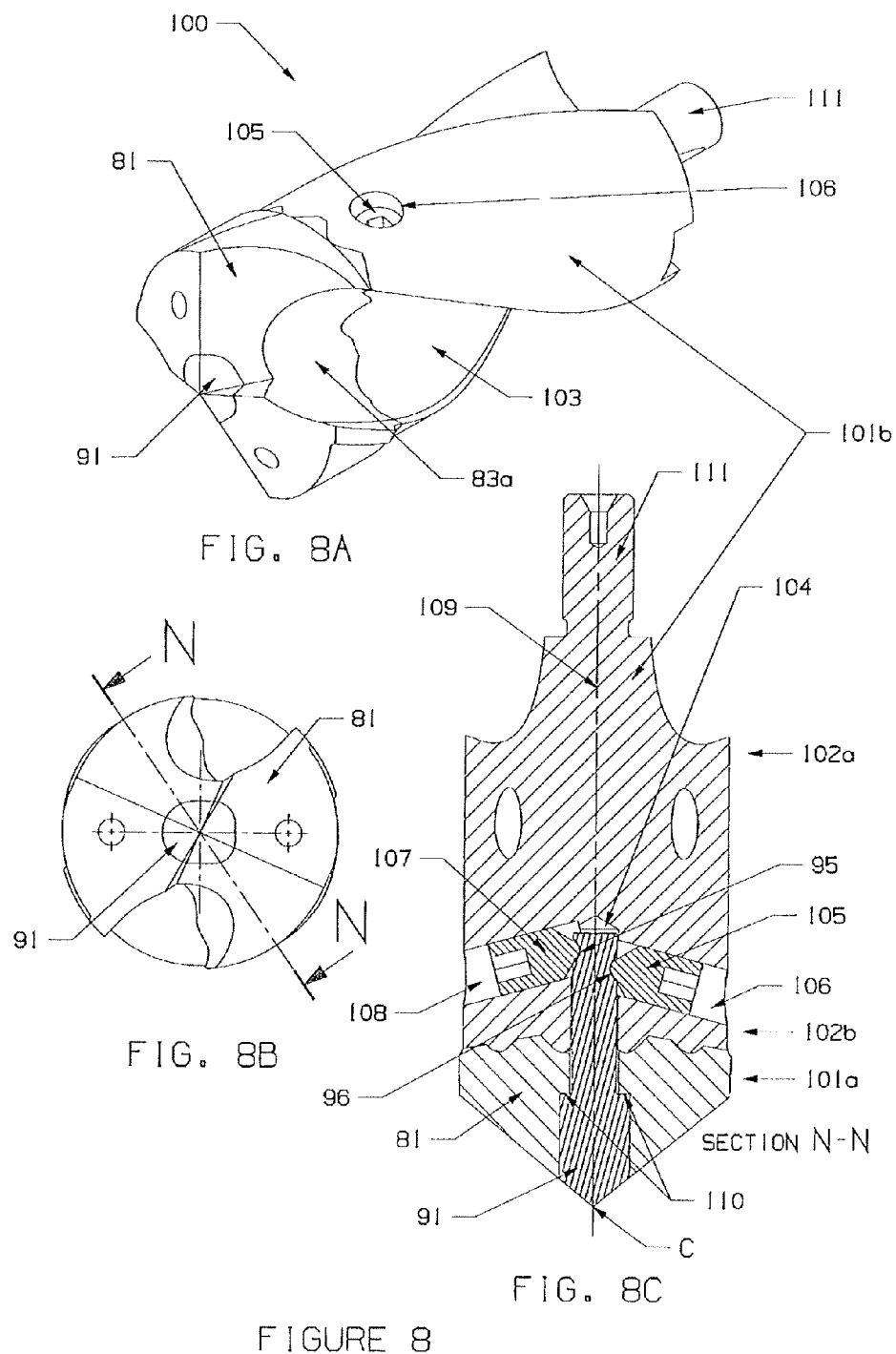
FIGS. 8A to 8C schematically depict various aspects of an additional non-limiting embodiment of a twist drill according to the present disclosure, including a body portion, an attachment portion, and a multi-piece twist drill head including the peripheral piece shown in FIGS. 6A to 6C and the core piece shown in FIGS. 7A to 7C.

FIGS. 6-8 depict aspects of an alternate non-limiting embodiment of a multi-piece twist drill 100 according to the present disclosure, including a core piece 91, a peripheral piece 81, and a body portion 101*b*. FIGS. 6A to 6C are schematic views showing aspects of peripheral piece 81 of twist drill 100 according to the present disclosure. Peripheral piece 81 is shown in a front-end view in FIG. 6A and includes cavity 82 into which core piece 91 may be disposed, helical flutes 83*a* and 83*b*, and coolant holes 84*a* and 84*b*. As in peripheral piece embodiments 12 and 41, the cavity 82 has a periphery that is asymmetrical, which may facilitate properly orienting the core piece 91 in the cavity 82 and inhibits rotation of the core piece 91 in the cavity 82. As shown in FIG. 6A, the peripheral piece 81 includes cutting edges 88*a*,88*b*, 89*a*,89*b*. FIG. 6B schematically depicts peripheral piece 81 in a side-view and in dotted lines shows the positions of the cavity 82 and the coolant holes 84*a*,84*b*. Peripheral piece 81 includes crests 85 to facilitate properly orienting the peripheral piece 81 on the attachment portion 101*b* of the twist drill 100 and to inhibit rotation of the peripheral piece 81 relative to the attachment portion 101*b*. FIG. 6C is a sectioned view of peripheral piece 81 taken along the rotational axis of the peripheral piece 81 at line H-H in FIG. 6A. FIG. 6C shows that the cavity 82 is disposed along the rotational axis 87 of the peripheral piece 81 and includes stepped region 86.

FIGS. 7A to 7C are schematic views showing aspects of core piece 91 of twist drill 100. Core piece 91 is shown in a front-end view in FIG. 7A and includes cutting edges 97*a*, 97*b*,98*a*,98*b* which align with corresponding cutting edges on the peripheral piece 81 when the core piece 91 is disposed and properly oriented in the cavity 82 of the peripheral piece 81. FIG. 7B schematically depicts core piece 91 in a side view and shows the geometry of the tool tip 99, which includes cutting edges 97*a*,97*b*,98*a*,98*b*. FIG. 7C is a sectioned view of core piece 91 taken along the piece's longitudinal axis in the direction of arrows G-G in FIG. 7A. Core piece 91 includes a relatively large diameter head portion 93 and a relatively small diameter tail portion 94, and further includes notches 95 and 96 located near an end of the tail portion 94. The asymmetrical periphery of the head portion 93 matches the asymmetrical periphery of the cavity 82 in the peripheral piece 81, and the diameter of the tail portion 94 closely matches the diameter of the stepped region 86 of the cavity 82.

FIGS. 8A to 8C are schematic illustrations showing aspects of the multi-piece twist drill 100, wherein the core piece 91 is mated with the peripheral piece 81 to form multi-piece twist drill head 101*a*, which is attached to attachment portion 101*b*. FIG. 8A is a perspective view of the multi-piece twist drill 100 and shows that helical flute 83*a* on peripheral piece 81 aligns with helical flute 103 on attachment portion 101*b*. FIG. 8A also illustrates the alignment of the cutting edges on the faces of the peripheral piece 81 and the core piece 91 when the core piece 91 is properly oriented in the cavity 82 of the peripheral piece 81. FIG. 8B is a schematic front-end view of the multi-piece twist drill 100 indicating the alignment of the cutting edges on the face of the core piece 91 and the peripheral piece 81, and also indicating alignment of the helical flute sections on the peripheral piece 81 and the attachment portion 101b. The core piece 91 and the peripheral piece 81 are adapted to mate to provide a central region and a peripheral region, respectively, of the multi-piece twist drill head 101a.

FIG. 8C is a sectioned view of the multi-piece twist drill 100 taken along the rotational axis 109 of the twist drill 100 through the tool tip C at line N-N in FIG. 8B. As shown in FIG. 8C, body portion 101b includes first end 102a and second end 102b. An attachment portion 111 (with relatively small diameter) adapted to attach the twist drill 100 to a machine tool is disposed at the first end 102a. The non-permanent mechanical attachment technique of twist drill 100 uses a set screw arrangement to both secure the core piece 91 in the cavity 82 of the peripheral piece 81 and to attach the twist drill head 101a to the second end 102b of the body portion 101b. To assemble the twist drill 100, the peripheral piece 81 is disposed in the proper orientation on the second end 102b of the body portion 101b. This aligns the cavity 82 of the peripheral piece 81 with a longitudinal cavity 104 in the second end 102b of the body portion 101b. The core piece 91 is disposed in the cavity 82. Head portion 93 of the core piece 91 abuts surface 110 and retains the head portion 93 in position in the cavity 82. Tail portion 94 of the core piece 91 extends through the stepped region 86 of the cavity 82 and into the longitudinal cavity 104 in the body portion 101b. Angled threaded bores 106,108 are provided in the body portion 101b and intersect the longitudinal cavity 104. Threaded set screws 105,107 are threadedly disposed in threaded bores 106,108, respectively. Threadedly advancing threaded set screws 105,107 into threaded bores 106,108 advances the tips of the set screw 105,107 into corresponding notches 96,95. Given the angled arrangement of the bores 106,108 relative to the longitudinal axis of the cavity 104, advancement of the set screws 105,107 applies a force on the notches 95,96 of the core piece 91 to secure the multi-piece twist drill head 101a to the twist drill body portion 101b and also secures the core piece 91 in the peripheral piece 81. Retraction of the set screws 105,107 frees the tail portion 94 of the core piece 91 and allows for disassembly and, if desired, replacement of any of the individual elements.

Certain significant advantages provided by the multi-piece construction of twist drill heads and twist drills described herein are discussed above. A significant advantage of the multi-piece construction is that various regions of the twist drill head may be embodied in separately removable pieces. Thus, regions of the twist drill head that experience forces more aggressively promoting wear and/or breakage may be selectively replaced or indexed to present a new cutting edge to the workpiece. Given that the cutting speed of outer regions of the cutting edge (regions remote from the rotational axis of the drill) is greater than the cutting speed nearer the drill's rotational axis, the outer regions of a twist drill head typically are subjected to greater wear if the twist drill head is made of a homogenous material. Once the outer regions of the cutting edge of, for example a conventional twist drill head, have worn or become damaged to an unacceptable degree, the entire drill head (if it is removable) or the entire drill (if the drill head is fixed) must be replaced. In embodiments of a twist drill head having the unique multi-piece construction according to the present disclosure, the cutting edge is formed by multiple (i.e., two or more) pieces. Thus, only those pieces having cutting edges that suffer from unacceptable wear and/or breakage during use need to be indexed or replaced.

As also discussed herein, the multiple-piece design of the twist drill heads according to the present disclosure allows for the use of different materials or material grades in the individual pieces. In this way, materials more resistant to wear forces and/or having other advantageous mechanical properties can be used in the particular piece or pieces subjected to greater wear forces, while materials having more toughness can be used in the particular piece or pieces subjected to greater impact forces. As noted in the Background section above, certain one-piece drill embodiments are known wherein different metallurgically bonded regions of the drill are composed of different composite materials. In this way, the tendency for outer regions, which run at faster cutting speeds, to wear at a faster rate can be addressed by providing composite materials having greater wear resistance in those outer regions. As further noted above, however, the production of composite drills requires additional processing steps and expense. The present multi-piece construction can be adapted to provide twist drill heads having enhanced wear resistance properties in the regions where needed, without the need to produce the twist drill head as a one-piece, monolithic component. Each of the two or more individual core and peripheral pieces making up a twist drill head according to the present disclosure may be made of, for example, a single material such as a single cemented carbide, tool steel, or other suitable material, having mechanical properties (for example, wear resistance, toughness, and strength) desired for the particular region of the twist drill head.

FIGS. 9A to 9D schematically depict a non-limiting embodiment of a multi-piece twist drill head 130 according to the present disclosure, wherein permanent mechanical joining is used to mate a core piece 121 and a peripheral piece 131 to form the multi-piece twist drill head 130. FIG. 9A depicts the core piece 121, which includes a head portion 122, having a drill tip geometry 123, and a tail portion 124 including threads 125 encircling a longitudinal rotational axis 126 of the core piece 121. The head portion 122 has a cylindrical surface defined by a diameter $\Phi CORE$ with its center axis aligned with the rotational axis 126. FIG. 9B depicts the peripheral piece 131 which includes a cylindrical cavity 132 defined by a diameter $\Phi CAVITY$ with its center axis aligned with a rotational axis 135 of the peripheral piece 131. The peripheral piece 131 also includes coolant holes 134a,134b, flutes 133a,133b (see FIG. 9C), a flat end surface 136, a stepped cavity portion 137, and a collar 127 functioning to protect against the lateral forces generated during the drill process. The diameter $\Phi CORE$ of the head portion 122 of the core piece 121 is slightly larger than the diameter $\Phi CAVITY$ of the cavity 132 of the peripheral piece 131. Thus, a permanent mechanical joining method, for instance, a hydraulic press fit, may be used to force the head portion 122 of the core piece 121 into the cavity 132 of the peripheral piece 131 to inseparably mate the pieces 121,131 and form multi-piece twist drill head 130. The assembled twist drill head 130 is shown in FIGS. 9C and 9D, where FIG. 9D is a sectional view taken through the rotational axis 140 of the twist drill head 130 in the direction of arrows R-R in FIG. 9C. As suggested in FIG. 9C, the hydraulic press fit process must be conducted so that the front cutting edges 128a,128b and 129a,129b of the core piece 121 align with the front cutting edges 138a, 138b and 139a,139b of the peripheral piece 131, respectively. As shown in FIG. 9D, the threaded region of the tail portion 124 protrudes from the end of the stepped cavity portion 137. Thus, the protruding threaded tail portion 124 may be threaded into the threaded hole of a body portion (not shown) to provide a twist drill including the twist drill head 130 having rotational axis 140.

Figures 10, 10A, 10B, 10C, 10D:
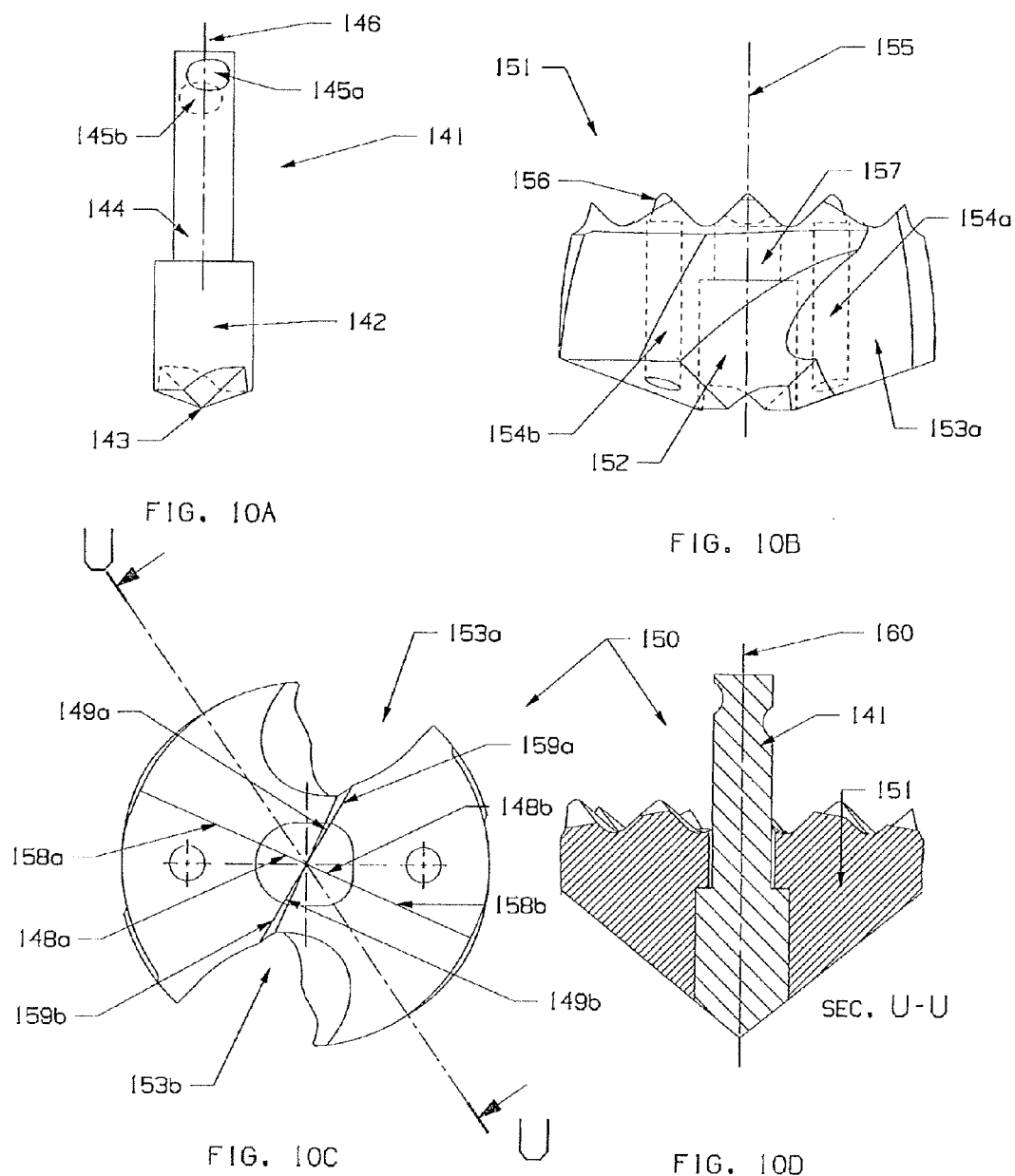
FIGS. 10A to 10D schematically depict various aspects of yet a further non-limiting embodiment of a multiple-piece twist drill head according to the present disclosure, wherein permanent mechanical joining is used to mate a core piece and a peripheral piece of the twist drill head.

FIGS. 10A to 10D depict an additional non-limiting embodiment of a multi-piece twist drill head 150 wherein permanent mechanical joining is used to join a core piece 141 and a peripheral piece 151 together to form the multi-piece twist drill head 150. FIG. 10A illustrates the core piece 141, which includes a head portion 142, having a drill tip geometry 143, and a tail portion 144 including two notches 145*a*,145*b* on a periphery thereof, spaced apart along the longitudinal rotation axis 146. The head portion 142 of the core piece 141 has an asymmetrical periphery that is similar to the asymmetrical periphery of the head portion 93 of the core piece 91 shown in FIG. 7A. As shown in FIG. 10B, the peripheral piece 151 includes a cavity 152 and a rotational axis 155. The periphery of the cavity 152 is asymmetrical and similar to the cavity 82 of the peripheral piece 81 shown in FIG. 6A, thereby facilitating properly orienting the core piece 141 within the cavity 152 during the process of permanent mechanical joining of the core piece 141 and the peripheral piece 151. Further, the peripheral piece 151 includes coolant holes 154*a*, 154*b*, flutes 153*a*,153*b* (see FIG. 10O), a stepped hole 157, and an optional crested end surface 156.

The periphery of the head portion 142 of the core piece 141 of the drill head 150 is slightly larger than the periphery of the cavity 152 of the peripheral piece 151. Therefore, a permanent mechanical joining method such as, for example, a hydraulic press fit process, may be used to force the head portion 142 of the core piece 141 into the cavity 152 of the peripheral piece 151 and thereby inseparably mate the pieces to form the multi-piece twist drill head 150. The assembled twist drill head is shown in FIGS. 10C and 10D, where FIG. 10D is a sectional view taken through the rotational axis 160 of the twist drill head 150 in the direction of arrows U-U in FIG. 10O. As shown in FIG. 10O, after the hydraulic press fit operation, the front cutting edges 148*a*,148*b* and 149*a*,149*b* of the core piece 141 align with the front cutting edges 158*a*, 158*b* and 159*a*,159*b* of the peripheral piece 151, respectively. The assembled twist drill head 150 may be fastened by two set screws to a body portion having a design similar to body portion 101*b* shown in FIGS. 8A and 8C. As in FIG. 8C, two threaded set screws may be advanced in angled threaded bores in the body portion to impinge on the notches 145*a*, 145*b* to secure the twist drill head 150 to the body portion.

FIGS. 11A to 11D depict a non-limiting embodiment of a multi-piece twist drill head 190 according to the present disclosure wherein at least one piece of the multi-piece twist drill head 190 includes at least two identical drill cutting geometries that are indexable. As shown in FIG. 11A, the core piece 170 of twist drill head 190 is indexable between two identical drill tip geometries 171 and 172 along the rotational axis 175. The drill tip geometry 172 is a mirror of the drill tip geometry 171 with regard to the axis 173 of the cross hole 174. Axis 173 is perpendicular to the rotational axis 175 of the core piece 170. FIG. 11B depicts a peripheral piece 180 which includes a cavity 181, a stepped hole 182 along the rotational axis 186, coolant holes 183*a*,193*b*, crests 187 on the back end face, a stepped cross hole 184, a cross hole 185, angled surfaces 189 at the end of the cavity 181, and helical flutes 188*a*,188*b* (see FIG. 11C). The stepped cross hole 184 and the cross hole 185 intersect the cavity 181. FIG. 11C shows the core piece 170 disposed in the cavity 181 of the peripheral piece 180. FIG. 11D is a sectioned view, taken through the rotational axis 195 of the twist drill head 100 in the direction of arrows F-F in FIG. 11C. In FIG. 11D, drill tip geometry 171 of the core piece 170 is presented to form a complete drill cutting geometry 197 with the peripheral piece 180, while the second drill tip geometry 172 is seating against the angled surfaces 189 within the cavity 181 of the peripheral piece 180. The core piece 170 is secured to the peripheral piece 180 by a threaded bolt 191 and an internal wrench nut 192. The multi-piece twist drill head 190 can be secured to a body portion (not shown) by screw 194 secured in a threaded hole on the end of the body portion. It will be understood from a review of FIGS. 11A to 11D that the peripheral piece is first secured to the body portion by screw 194 disposed in stepped hole 182, and the core piece 170 is then secured in cavity 181 by threaded bolt 191. When there is need to replace the drill tip geometry 171 due to broken or worn cutting edges, the second drill tip geometry 172, which is indexable with the first drill tip geometry 171 with regard to the center axis 193 of the cross holes 184, 185, can be presented to form a new complete drill cutting geometry 197.

Embodiments of multi-piece twist drill heads and drills according to the present disclosure may be designed with a wide range of geometric features that a conventional one-piece solid twist drill or indexable twist drill insert may possess. Embodiments of multi-piece drill heads according to the present disclosure may be, for example, of conventional size and adapted for conventional use in a variety of drilling applications.

It will be understood that the present description illustrates those aspects of the invention relevant to a clear understanding of the invention. Certain aspects that would be apparent to those of ordinary skill in the art and that, therefore, would not facilitate a better understanding of the invention, have not been presented in order to simplify the present description. For example, it will be understood that the core and peripheral pieces and other components making up multi-piece twist drill heads and drills according to the present disclosure may be made from conventional materials using conventional manufacturing techniques known to those having ordinary skill in the art. As such, possible manufacturing techniques will be readily known to those of ordinary skill upon considering the present description and are not described herein.

Also, although only a limited number of embodiments of multi-piece twist drill heads according to the present description necessarily are described herein, one of ordinary skill in the art will, upon considering the foregoing description, recognize that many modifications and variations of the invention may be employed. All such variations and modifications of the invention are intended to be covered by the foregoing description and the following claims. The foregoing examples of possible designs for multi-piece twist drill heads and twist drills according to the present disclosure are offered by way of example only, and are not exhaustive of all designs within the scope of the present disclosure. Those having ordinary skill, upon reading the present disclosure, may readily identify additional designs that are embodiments within the scope of the present disclosure. It is understood, therefore, that this invention is not limited to the particular embodiments disclosed herein, but it is intended to cover modifications that are within the principle and scope of the invention, as defined by the claims.

The invention claimed is:

1. A multi-piece twist drill head comprising:
   a core piece formed from a first hard material and comprising a cutting edge; and
   a peripheral piece formed from a second hard material and comprising a cutting edge and at least one helical flute,
   wherein the core piece and peripheral piece are adapted to mate to provide a central region and a peripheral region, respectively, of the multi-piece twist drill head;
   wherein the peripheral piece comprises a cavity and the core piece is disposed in the cavity;
   wherein the core piece and the peripheral piece are adapted to be mated by permanent mechanical joining comprising at least one of soldering, welding, brazing, hydraulic press fitting, and adhering and wherein the core piece and peripheral piece are each configured to be removed from the twist drill head and replaced.

2. The multi-piece twist drill head of claim 1, wherein:
the first hard material is selected from the group consisting of a cemented carbide, a ceramic, and a diamond-containing material; and
the second hard material is selected from the group consisting of a cemented carbide, a ceramic, and a diamond-containing material.

3. The multi-piece twist drill head of claim 1, wherein the first hard material and the second hard material are different grades of the same material selected from the group consisting of cemented carbide, ceramic, and diamond-containing material.

4. The multi-piece twist drill head of claim 1, wherein the second hard material exhibits greater wear resistance than the first hard material.

5. The multi-piece twist drill head of claim 1, wherein the cutting edge of the core piece forms a twist drill tool tip geometry, and the cutting edge of the peripheral piece forms a partial drill front geometry and side cutting geometry.

6. The multi-piece twist drill head of claim 1, wherein a periphery of the cavity of the peripheral piece is asymmetric relative to a rotational axis of the multi-piece twist drill head.

7. The multi-piece twist drill head of claim 1, wherein a periphery of the core piece is asymmetric relative to a rotational axis of the multi-piece twist drill head.

8. The multi-piece twist drill head of claim 1, wherein the cutting edge of the core piece is aligned with the cutting edge of the peripheral piece when the peripheral piece is mated with the core piece.

9. A twist drill comprising:
a body portion including a first end and a second end, the body portion including a helical flute on a periphery thereof;
an attachment portion at the first end of the body portion, wherein the attachment portion is adapted to connect the multi-piece twist drill to a machine tool; and
a multi-piece twist drill head adapted to attach to the second end of the body portion and including
a core piece formed from a first hard material, and
a peripheral piece formed from a second hard material and comprising a cutting edge and at least one helical flute,
wherein the core piece and peripheral piece are adapted to mate to provide a central region and a peripheral region, respectively, of the multi-piece twist drill head;
wherein the peripheral piece comprises a cavity and the core piece is disposed in the cavity; and
wherein the core piece and the peripheral piece are adapted to be mated by permanent mechanical joining comprising at least one of soldering, welding, brazing, hydraulic press fitting, and adhering.

10. The twist drill of claim 9, wherein:
the first hard material is selected from the group consisting of a cemented carbide, a ceramic and a diamond-containing material; and
the second hard material is selected from the group consisting a cemented carbide, a ceramic and a diamond-containing material.

11. The twist drill of claim 9, wherein the first hard material and the second hard material are different grades of the same material selected from the group consisting of cemented carbide, ceramic, and diamond-containing material.

12. The twist drill of claim 9, wherein the second hard material exhibits greater wear resistance than the first hard material.

13. The twist drill of claim 9, wherein the core piece comprises a cutting edge.

14. The twist drill of claim 13, wherein the cutting edge of the core piece forms a twist drill tool tip geometry, and the cutting edge of the peripheral piece forms a partial drill front geometry and side cutting geometry.

15. The twist drill of claim 13, wherein the cutting edge of the core piece is aligned with the cutting edge of the peripheral piece when the peripheral piece is mated with the core piece.

16. The multi-piece twist drill of claim 13, wherein the cutting edge of the core piece is aligned with the cutting edge of the peripheral piece when the core piece is disposed in the cavity of the peripheral piece.

17. The twist drill of claim 9, wherein the core piece and peripheral piece are each configured to be removed from the twist drill head and replaced.

18. The twist drill of claim 9, wherein a periphery of the cavity of the peripheral piece is asymmetric relative to a rotational axis of the twist drill.

19. The multi-piece twist drill of claim 9, wherein the at least one helical flute of the peripheral piece is aligned with the helical flute of the body portion.

* * * * *